UNITED STATES PATENT OFFICE.

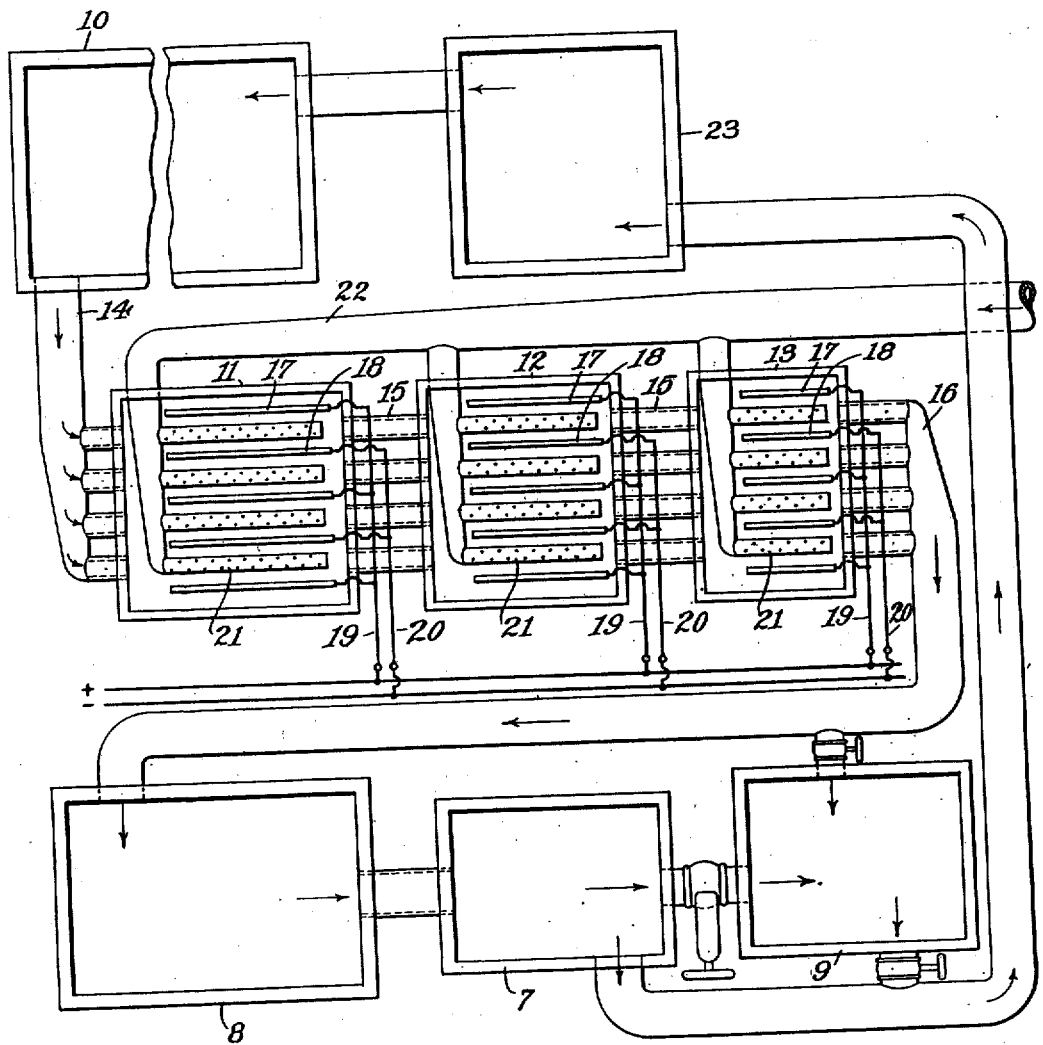

ARTHUR E. HALL, OF OMAHA, NEBRASKA, ASSIGNOR TO AMERICAN SMELTING AND REFINING COMPANY, OF NEW YORK, N. Y., A CORPORATION OF NEW JERSEY.

ELECTROLYTIC PRODUCTION OF ZINC.

1,380,711.      Specification of Letters Patent.     Patented June 7, 1921.

Application filed July 15, 1915. Serial No. 39,977.

*To all whom it may concern:*

Be it known that I, ARTHUR E. HALL, a citizen of the United States, residing at Omaha, in the county of Douglas and State of Nebraska, have invented certain new and useful Improvements in Electrolytic Production of Zinc, of which the following is a full, clear, and exact description.

My present invention relates to the recovery of zinc in metallic form from oxidized zinc ores, roasted sulfid ores, and particularly zinc oxid fumes, blue powder (also known as zinc dust), cyanid precipitates, and zinc drosses. Its chief object is to provide an effective and economical process for the purpose. In the preferred mode of procedure the process is continuous and cyclical, and the metal is deposited electrolytically on suitable cathodes or starting plates.

In the accompanying drawing I have shown in plan an apparatus suitable for practising the process in the preferred manner. Inasmuch as the invention is not limited to any particular apparatus, and since devices suitable for the purpose can readily be provided by any one skilled in the art, it is sufficient to illustrate the apparatus in a purely diagrammatic way and I have accordingly done so in the annexed drawing.

In starting the process I treat an excess of crude zinc-oxid-bearing material with dilute sulfuric acid, for example in a suitable vessel 7. This treatment may consist in simple leaching of the crushed material, or the contents of the vessel can be agitated by any suitable means, not shown. The residue, which for convenience may be termed residue $R_1$, still contains zinc oxid, and is from time to time removed to a vessel 8, for further treatment as described hereinafter; while of the solution (non-acid because of the excess of zinc oxid in vessel 7) part is delivered to a suitable vessel 9 for purification as described later and the remainder, with the purified solution from vessel 9, is delivered to the storage tank 10. The solution in the storage tank, which we may for convenience call solution $S_1$, is thus an aqueous solution of a zinc salt, neutral and of suitable concentration, free from iron, copper, arsenic, antimony and other impurities unfavorable to the electrolytic deposition of metallic zinc. As the process requires the presence of chlorin in this solution it may be necessary to add chlorin thereto, in the form of sodium chlorid, or zinc chlorid, or both, in amount sufficient to make the chlorin content 0.10% or more.

Solution $S_1$ is conveyed to a series or cascade of two or more electrolytic deposition cells, as 11, 12, 13, by a manifold 14, and passes from cell to cell though pipes 15. It is finally delivered from the last cell to a manifold 16. The cells contain the usual anodes and cathodes, as 17, 18, (which may be of lead and aluminum respectively), connected by taps or leads 19, 20 to the current supply-mains. In the bottom of each cell is a system of perforated pipes, as 21, supplied with air under pressure by a manifold 22 leading from a suitable source not shown. The pipes 21 are arranged to discharge the air uniformly between the electrodes of each pair; that is, between each anode and cathode. The agitation thus produced is important, as it prevents or minimizes pocketing and consequent local impoverishment of the electrolyte, and also depolarizes the cathode by causing detachment of any hydrogen or other bubbles that may form thereon. These results tend to make the cathode deposits uniform, hard, firm, and smooth, thereby increasing the yield of zinc.

The current density per unit cathode-area in the several cells is an important feature of the invention. In the first cell the electrolyte comes in neutral, but after the process has been in operation for a time it contains from 0.05% to 0.50% free sulfuric acid, liberated by the electrolytic action. This relatively low acidity gives the electrolyte a high resistance to the flow of current, and I therefore use a minimum current density. I have found in practice that thirteen amperes per square foot of cathode area is about as low as is consistent with a good deposition of metallic zinc.

In the second cell the electrolyte enters with some free sulfuric acid, and more is produced by the electrolytic action in the second cell. Because of this greater acidity and consequent less resistance of the liquor to the flow of current the current density in the second cell can be considerably increased, for example by decreasing the cathode area, as indicated in the drawing by the shorter length of the electrodes in cell 12. Twenty amperes per square foot of cathode surface may be given as an example of a suitable density, but in any case it should, for the best results, be high enough to minimize or prevent the deposition of hydrogen bubbles on the cathodes. In like manner the current density in the succeeding cell or cells is successively higher.

As the process proceeds, it will be observed that there is less polarization of the anodes than is usually encountered, and the solution issuing from the cascade (which we will call solution $S_2$) will be found to contain free chloric acid. Moreover, lead peroxid (or dioxid) is precipitated in the cells. These results can be explained on the theory that the chlorid present (sodium or zinc chlorid, or both, as mentioned above) is oxidized to chlorate by the anode reactions and that as the solution becomes acidic this chlorate is decomposed, liberating chloric acid; and that this chloric acid attacks the lead anode to a considerable extent, forming lead chlorate, which in turn is decomposed by the anodic reactions into lead peroxid and chloric acid. In this way the polarization of the anode is eliminated or greatly diminished, a result which contributes markedly to making it possible to use a current density of thirteen amperes per square foot of cathode area in a nearly neutral electrolyte, with a drop of voltage of only about 3.5 volts across the cell.

The lead peroxid produced is of a flaky nature and sinks rapidly to the bottom of the cells, whence it is removed in any convenient manner, as by sluicing it out, after which it can be reduced to metal and cast into anodes or can be used for the purpose described hereinafter. It may be said that the cost of reducing the peroxid is much more than offset by the saving of current incident to its production.

The aforesaid solution $S_2$, issuing from the last cell, contains chloric acid, corresponding to the amount of chlorid present at the beginning of the cycle. This acid in the subsequent leaching operation oxidizes any soluble ferrous iron to ferric iron, in which form the iron is precipitated when the solution is used later to treat zinc-oxid-bearing material in excess as hereinafter described. When this solution, purified, returns to the storage tank for subsequent electrolysis in the deposition cells it contains all the chlorin, in the form of chlorids, corresponding to the original chlorids.

Solution $S_2$ issuing from the last cell, impoverished as to zinc content and enriched as to content of free acid (particularly sulfuric) is delivered in considerable excess to vessel 8 containing residue $R_1$ as previously described. This solution by reason of its high content of free acid has a high leaching efficiency and hence dissolves practically all the zinc oxid in the said residue, leaving a residue which we may call residue $R_2$. The latter is removed to a suitable filter (not shown), washed, and may then be treated in any convenient manner for the recovery of any lead, copper, gold or silver values contained.

The solution produced by the described leaching or other treatment of residue $R_1$, which we may call solution $S_3$, contains free acid (because of the excess acid in solution $S_2$), and, together with the filtrate from the washing of residue $R_2$, is transferred to vessel 7, where it is used to treat an excess of zinc-oxid-bearing material, as described at the outset. This operation neutralizes the remaining free acid in the solution and precipitates all iron, copper and similar impurities. This solution, at least partially purified, we shall call solution $S_4$.

In solution $S_4$ there may be other impurities, as antimony and arsenic, these being usually or often present in soluble form in the crude zinc-oxid-bearing material. To reduce these to a harmless or negligible percentage the proper portion of the solution $S_4$ is transferred to vessel 9. This vessel is continually operated as a boiling tank, in which the solution delivered thereto is boiled for about an hour with sufficient blue powder and a small quantity of the acidic solution $S_2$ from the deposition cells. If more blue powder is available than enough for getting rid of the antimony and arsenic and it is desired to recover the zinc therefrom, the amount added to the purifying tank can be increased; in which case the amount of solution $S_2$ used is also increased. In this purifying operation the arsenic and antimony are all precipitated and the zinc in the blue powder is converted into sulfate, available for electro-deposition. The addition of the small amount of acidic solution $S_2$, from the deposition cells, is for the purpose of starting the action. The solution from the purifying tank 9, which we may call solution $S_5$, and solution $S_4$ from the leaching tank 7, are transferred to a suitable filter 23 and thence to storage tank 10 as solution $S_1$. This completes the cycle.

The foregoing operations, which, it will be understood, are carried on continuously, may be summarized briefly as follows:

From the storage tank 10 solution $S_1$ is delivered to the cascade of deposition cells 11, 12, 13 and issues therefrom as solution $S_2$, poor in zinc but relatively rich in free sulfuric and chloric acid. Solution $S_2$ is conveyed to vessel 8, where it is used in excess to treat the zinc-oxid-bearing residue $R_1$ from vessel 7. Issuing from the latter it still contains free acid and, now termed solution $S_3$, is delivered to vessel 7 containing an excess of zinc-oxid-bearing material, where the iron and copper are precipitated and all the free acid is neutralized by combination with zinc. Residue $R_2$, from the dissolving operation in tank 8, is removed from time to time for recovery of lead, copper, gold, silver, etc., and the residue $R_1$ from tank 7 is removed to tank 8. From tank 7 a portion of the liquid, now called solution $S_4$, is delivered through filter 23 to storage tank 10 as solution $S_1$, while the remainder passes to tank 9 where it is boiled with the proper quantity of solution $S_2$ (from the deposition cells) and a small amount of blue powder to eliminate arsenic and antimony. Issuing from tank 9 as solution $S_5$, it flows with solution $S_4$ to filter 23 and thence to tank 10 as part of solution $S_1$.

The residue from the purifying tank 9, which we may call residue $R_3$, is removed at convenient intervals and treated in any suitable way, as by smelting, etc., to recover any lead or other values contained therein. If blue powder is not available for the purifying operation, iron, preferably in the form of scrap, is used in the boiling tank 9, thereby precipitating the arsenic and antimony. Any excess iron is then removed and to the solution in the tank is added lead peroxid (derived from the deposition cells as previously described), which completely precipitates any dissolved iron. Inasmuch as only enough iron is dissolved to replace the arsenic and antimony the amount of lead peroxid needed for removal of the iron is small. However, if the peroxid is not continually available in sufficient amount, the residue from tank 9, in which residue the lead is present as a lower oxid, having given up part of its oxygen to the iron, is converted into red lead, as by heating for a sufficient time (say forty-eight hours) with access of air. The red lead so produced can then be used instead of peroxid to precipitate the iron. Otherwise the lower oxid in the said residue can be readily reduced to metallic lead.

The zinc deposited on the aluminum cathodes or starting sheets is stripped off, and is a superior grade of zinc suitable for purposes to which any grade of zinc can be put.

It is to be understood that the invention is not limited to the procedure herein specifically described, but can be practised in other ways without departure from its spirit.

I claim:

1. The continuous and cyclical process of producing metallic zinc by electrolytic deposition, comprising delivering to a cascade of deposition cells having lead anodes a neutral solution of a zinc salt, containing chlorin in suitable form; electrolyzing the solution with successively higher current densities, whereby zinc is deposited in metallic form and the acid of the zinc salt liberated, and lead peroxid and chloric acid are produced; removing the lead peroxid from the cells; treating with an excess of acidic solution from the cascade the residue left from previous treatment of an excess of zinc-bearing material, whereby the zinc of said residue is substantially all dissolved and the solution left acidic; treating with the acidic zinc-bearing solution fresh zinc-bearing material in excess, thereby neutralizing the solution, precipitating iron and similar impurities, and leaving zinc-bearing residue for treatment with an excess of acidic solution from the cascade as described above; treating more or less of the neutral solution to purification to remove other impurities; and returning the neutral solution, with the purified portion thereof, to the cascade of deposition cells.

2. In a cyclical process of producing metallic zinc by electrolytic action, the steps comprising electrolyzing in a suitable cell having a lead anode a neutral zinc-salt solution containing chlorin in the form of chlorid, whereby metallic zinc is deposited on the cathode with liberation of the acid with which the zinc was combined, polarization of the anode is decreased, and lead peroxid and chloric acid are produced; removing the lead peroxid; treating crude zinc-bearing solid material with an excess of acidic solution from the cell, whereby zinc is dissolved and any iron dissolved in ferrous form is converted to ferric form by the chloric acid; treating with the still acidic solution an excess of crude zinc-bearing solid material, whereby the remaining acid is neutralized by combination with zinc and iron is precipitated from the solution; and returning the now neutral solution to the deposition cell.

3. In a cyclical process of producing metallic zinc by electrolytic deposition, the steps comprising electrolyzing a neutral zinc-salt solution, whereby zinc is deposited and the acid with which it was combined is liberated; treating with the now acidic solution an excess of crude zinc-bearing material, whereby the acid is neutralized by combination with zinc in said material; boiling this solution together with a small amount of an acidic solution with blue powder, whereby any arsenic and antimony in solution are replaced by zinc contained in the blue powder and the arsenic and antimony are precipitated; and returning the neutral and now purified solution for electrolysis.

4. In the extraction of zinc from material containing zinc oxid in the wet way, the step of leaching an excess of zinc-oxid-bearing material with a solution containing sulfuric acid and chlorin in a form capable of oxidizing ferrous iron dissolved from said material.

5. In the electrochemical treatment of zinc leachings, the step of passing a solution containing dissolved zinc salts through a series of electrolytic cells in which successively greater current densities are used.

6. In the extraction of zinc from material containing zinc oxid in the wet way, the cyclical operation of leaching zinc-oxid-bearing material with a solution containing sulfuric acid and a chlorid, drawing off the solutions thereby produced, and electrolyzing the same to produce a solution containing sulfuric acid, leaching an additional quantity of the zinc-oxid-bearing material therewith, and repeating the cycle of operations.

7. A process of obtaining metallic zinc from material containing zinc compounds soluble in acid, which comprises leaching said materials with an acid solution to produce a solution of zinc salts, passing said solution successively through a series of electrolytic cells in which successively greater current densities are employed, treating zinc-oxid-bearing material with the resulting acid liquid, and repeating the cycle of operations.

8. The continuous and cyclical process of producing metallic zinc by electrolytic deposition, comprising treating an excess of zinc bearing material with a solution containing a relatively large amount of sulfuric acid and a relatively small amount of chlorid, whereby zinc is dissolved as sulfate, electrolyzing said solution to deposit metallic zinc and to produce a solution containing free sulfuric acid and chloric acid; treating zinc-bearing material with said solution, and repeating the cycle of operations.

9. The continuous and cyclical process of producing metallic zinc which comprises passing a solution containing zinc salts through electrolytic cells, and electrolyzing it therein, to deposit zinc and to produce a solution containing free acid and an oxidizing agent; treating material relatively poor in zinc with a portion of said solution containing free acid, whereby substantially all the zinc in said material is dissolved, and the solution left acid; treating an excess of material relatively rich in zinc with the still acid solution, whereby all the remaining acid of the solution is neutralized by dissolving zinc, and impurities are precipitated, further purifying said solution by treating the same with another portion of the acid solution containing oxidizing agent, adding blue powder to the mixture and boiling the same, and thereafter returning the so purified solution containing zinc compounds to the electrolytic cells.

10. The herein described cyclical process of treating zinc-oxid-bearing material which comprises subjecting zinc-oxid-bearing material to an excess of an acid leaching solution containing sulfuric acid and a chlorin compound having oxidizing properties, then subjecting an excess of zinc-oxid-bearing material to the resulting solution, removing undissolved materials from the solution, electrolyzing the solution to produce metallic zinc and to regenerate the acid leaching solution containing a chlorin compound having oxidizing properties and repeating the cycle of operations.

11. In the process of leaching zinc bearing material, the step of purifying the solution from arsenic, antimony and similar materials by heating the same with finely divided metallic zinc.

12. The step which comprises boiling a solution containing zinc sulfate and impurities such as arsenic, antimony and the like with finely divided metallic zinc and with a small amount of an acid liquor.

13. The cyclical process of leaching zinc-oxid-bearing material which comprises (1) treating zinc-oxid-bearing material with an excess of an acid solution containing sulfuric acid, (2) separating the liquid from the undissolved residue, (3) treating an excess of zinc-oxid-bearing material with said solution in the presence of an oxidizing agent, whereby iron is precipitated, (4) and separating the liquid from the undissolved residue, (5) electrolyzing the liquid thereby produced to simultaneously deposit zinc and produce an acid leach liquor containing the oxidizing agent.

14. In the electrolytic production of zinc the step of electrolyzing a solution of zinc sulfate containing a chlorid of an alkali-forming metal, whereby zinc is deposited and a solution containing sulfuric acid and a chlorin-containing oxidizing compound produced, and thereafter treating zinc-oxid-bearing material with the said solution.

15. In the electro-chemical treatment of leached solutions containing zinc, the step of passing a solution of a zinc salt of an acid which salt offers a higher resistance to the flow of electric current than does said acid, through a series of electrolytic cells, in which successively greater current densities are employed.

16. The process which comprises passing through a series of electrolytic cells, a solution of a zinc salt of an acid, which salt offers higher resistance to the flow of current than does said acid, and employing successively higher current densities in the successive cells.

17. The herein described step which comprises electrolyzing a solution of a zinc salt while introducing air near the bottom of the solution, whereby the solution is agitated and kept substantially uniform throughout its body as regards concentration and acidity.

18. As an improvement in the treatment of leach-solutions containing zinc sulfate, the step of passing a solution containing zinc sulfate through a plurality of electrolytic cells, in which successively greater current densities are used.

In testimony whereof I hereunto affix my signature.

ARTHUR E. HALL.

Witnesses:
F. S. HOLBROOK,
SIMEON JONES.